Oct. 31, 1961 — M. A. CUTLER — 3,007,016
INTERLOCKING MECHANISM FOR ELECTRIC POWER TAP-OFF
UNITS IN A PLUG-IN TYPE BUSWAY SYSTEM
Filed Nov. 26, 1958 — 3 Sheets-Sheet 1

INVENTOR.
MYRON A. CUTLER
BY Robert N. Carey
ATTORNEY

INVENTOR.
MYRON A. CUTLER
BY Robert P. Casey
ATTORNEY

INVENTOR.
MYRON A. CUTLER
BY Robert F. Casey
ATTORNEY

United States Patent Office 3,007,016
Patented Oct. 31, 1961

3,007,016
INTERLOCKING MECHANISM FOR ELECTRIC POWER TAP-OFF UNITS IN A PLUG-IN TYPE BUSWAY SYSTEM
Myron A. Cutler, Plainville, Conn., assignor to General Electric Company, a corporation of New York
Filed Nov. 26, 1958, Ser. No. 776,555
14 Claims. (Cl. 200—50)

This invention relates to electric power distribution systems, and more particularly it relates to an interlocking mechanism for power tap-off units used in connection with low-voltage plug-in type bus bar distribution systems.

Bus bar distribution systems, commonly referred to as busways, are used for the safe and efficient distribution of multiphase electric power in industrial plants, office buildings and the like. In essence a busway comprises a plurality of elongated electrical conductors or bus bars connected for energization to the respective phases of a polyphase electric power source and enclosed in a grounded metal unit or housing. The bus bars are supported in side-by-side, spaced-apart relation within the metal housing, and suitable insulation is provided to ensure that each phase is electrically isolated from the other phases and from ground. Plug-in type busways are busways having provisions at spaced intervals for the convenient connection of removable metal units enclosing power tap-off devices such as safety switches, circuit breakers, fuses, or the like, the purpose of each tap-off unit being to control the supply of electric power to a particular utilization circuit.

Such tap-off units are removably mounted on the busway housing, and the tap-off devices enclosed therein are connected to the electric power source by means of suitable plug-in type disconnect contacts disposed to engage cooperating uninsulated portions of the respective bus bars. A tap-off unit is conventionally equipped with an openable cover for providing convenient access to its interior and to the front of the enclosed device, and suitable means is provided for operating the device from outside the unit. The operating means for the enclosed device may take the form, for example, of an external operating handle mounted on the unit, or the device may be coupled to the access cover in such a manner that its operation is controlled by opening and closing the cover.

Proper operating procedure during installation and servicing of a tap-off unit requires that the utilization circuit to which the unit is connected be open and de-energized while engagement or disengagement of the cooperating disconnect contacts is being effected, whereby the act of making or breaking the electrical connection between the tap-off device and the busway will not make or interrupt a "live" circuit. Toward this end, it is desirable to provide an interlocking mechanism controlled by the operating means of the enclosed tap-off device to prevent mounting and dismounting of the removable unit with respect to the busway unless the device is in an open-circuit condition.

In prior art interlock mechanisms of which I am aware, it is possible by the improper application of sufficient force to overcome the mechanism and defeat its normal function. As applied to the interlocking mechanism mentioned above, such an improper operation would enable a person to mount the removable unit on the busway with the enclosed tap-off device in a closed-circuit condition.

A general object of the present invention is to provide in an electric power distribution system a simple and inexpensive yet relatively foolproof mechanism for controlling the operation of an interlock which positively prevents the mounting and dismounting of a removable tap-off unit with respect to a relatively stationary housing under preselected conditions.

Another object of the invention is the provision of improved interlocking mechanism for removable tap-off units associated with a plug-in type busway, the removable units enclosing power tap-off devices which are operated by external handles or by the act of opening or closing an access cover of the unit.

Still another object is the provision of an interlocking mechanism for a removable tap-off unit to prevent opening of the unit cover and hence access to its interior whenever the unit is mounted on a plug-in type busway.

A further object of this invention is to provide relatively simple and inexpensive interlocking mechanisms for performing various interlock functions in electric power tap-off units of various types, the interlocking mechanisms being constructed with common, interchangeable parts.

Another object of my invention is to provide an improved interlocking mechanism which can not be forceably overcome or defeated by improper operation.

My invention in one form is applicable to a plug-in type electric busway comprising a relatively stationary unit housing conductors for connection to a source of electric power and a removable unit housing a circuit controlling tap-off device. The removable unit has an openable access cover, and operating means including an external operating handle is supported by the unit in cooperation with a switch member of the tap-off device for operating the device. The removable unit is adapted for mounting and dismounting with respect to the stationary unit, and disconnect contacts of suitable construction are provided for establishing electrical connection between the tap-off device and the source of power with the removable unit mounted on the stationary unit. An interlock member supported by the removable unit for movement between two different positions with respect thereto is disposed in cooperation with the stationary unit to positively prevent mounting or dismounting of the removable unit whenever the interlock member is in a predetermined one of its two positions. An interlocking mechanism is provided for actuating the interlock member in accordance with operation of the aforesaid operating means, whereby the interlock member will be in its predetermined one position whenever the tap-off device is in a closed-circuit condition. In one form of the invention, the interlocking mechanism comprises an elongated lever connected to the operating means for movement in response to operation of the tap-off device and a bell crank coupled to the lever and to the interlock member for translating the movement of the lever into movement of the interlock member.

In one aspect of my invention, operation of the tap-off device contained in the removable unit, instead of being controlled by an external operating handle, is arranged to be controlled by movement of the access cover of the unit, and the interlocking mechanism is disposed to interconnect the cover and the interlock member for actuating the interlock member in accordance with the opening and closing of the cover. In this manner the interlock member is moved to its predetermined one position whenever the access cover is closed.

In a different aspect of the invention, the interlocking mechanism is arranged to releasably hold the access door closed whenever the removable unit is mounted on the stationary unit. This makes it necessary to dismount the removable unit from the stationary unit in order to gain access to its interior, thereby preventing access to the inside of the removable unit while the parts disposed therein are energized or "live."

In another aspect of the invention, the elongated lever of the interlocking mechanism is spring biased from an active position to a normally inactive position, the active position of the lever corresponding to the predetermined one position of the interlock member. The lever is provided with a rigid stop portion reciprocally movable along a linear path between first and second positions, the first position of the stop portion corresponding to the active position of the lever. A cooperating blocking member is disposed for rectilinear movement between opposite ends of a predetermined path which is perpendicular to the linear path of movement of the stop portion. Motion is imparted to the blocking member by the same actuating means which moves the lever against its bias to its active position, and as the stop portion of the lever is moved into its first position the blocking member is moved to an end of its predetermined path where it is disposed in the linear path of the stop portion in interfering relationship therewith. This positively blocks the stop portion in its first position (and consequently blocks the lever in its active position) until the blocking member is moved out of its interfering position by operation of the aforesaid actuating means. As a result, the interlocking mechanism can not be overcome or defeated by force improperly applied to the interlock member.

My invention will be better understood and its various objects and advantages will be more fully appreciated from the following description taken in conjunction with the accompanying drawings in which.

Figure 1:
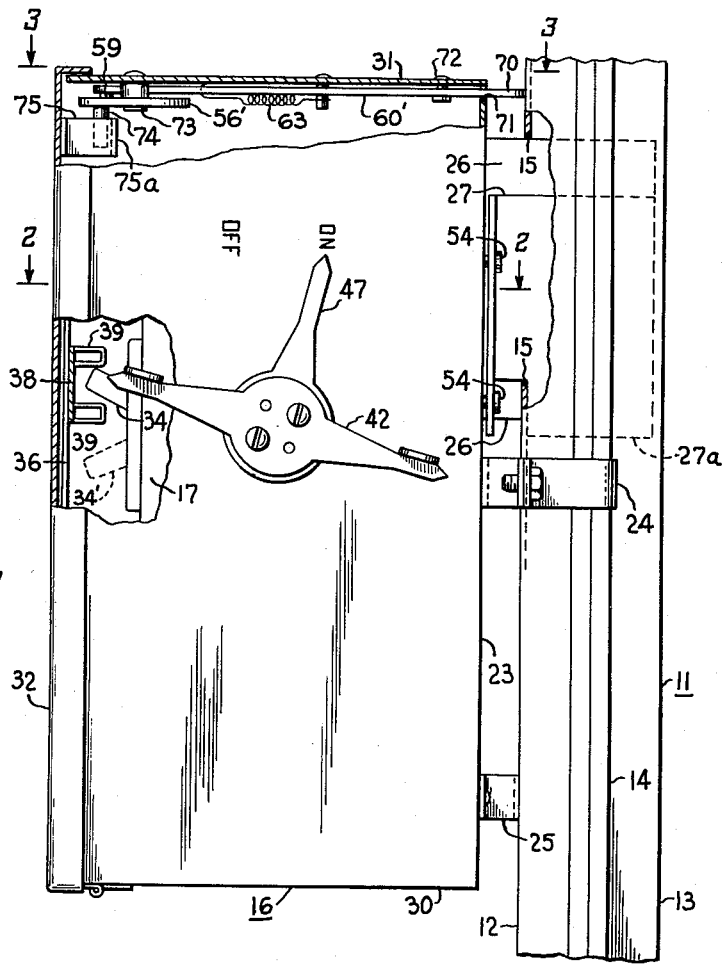
FIG. 1 is a side elevation, partly in section, of a removable tap-off unit constructed in accordance with a preferred embodiment of this invention and mounted on a busway section.

Referring now to FIG. 1, I have shown for the purpose of illustration a busway section comprising a relatively stationary unit 11 housing four spaced-apart elongated conductors or bus bars (not shown) for connection to a source of polyphase alternating current. The busway 11 includes a generally duct-like sheet metal enclosure comprising top and bottom cover plates 12 and 13, respectively, of sheet steel. Each cover plate in section is a wide channel having relatively narrow flanges, and the cover plates 12 and 13 are rigidly fastened together in inverted relation by appropriate rivets or the like in their corresponding flanges. As can be seen in FIG. 1, the cooperating flanges of the top and bottom cover plates 12 and 13 provide a continuous rail 14 for attaching suitable busway hangers at any point along the length of the busway 11. Although a vertical run of busway has been shown, it is also common practice to orient the busway in a horizontal direction.

As is shown in FIG. 1, the cover plate 12 of the busway enclosure is provided with an aperture 15 for providing limited access to the enclosed bus bars. In this manner an outlet is provided for the power tap-off unit. Other suitable outlets (not shown) are disposed at longitudinally spaced intervals along the busway run. A sliding cover (not shown) may be used to cover the aperture 15 when this outlet is not being used.

The bus bars of busway 11 preferably comprise hollow tubular conductors having oblong cross sections. Each bar is individually covered by butylic insulation or the like for its entire length. A portion of the insulation of each bus bar is removed and the edge of the bar is slotted where it is exposed by the aperture 15. The inner surfaces of the hollow bar adjacent this slot serve as relatively stationary disconnect contacts associated with the busway 11 for engagement by cooperating blade-like plug-in disconnect contacts of the tap-off unit. A busway of this general construction is described in detail and is claimed in a copending patent application of Frank C. Johnston and Paul Krauss S.N. 737,954 filed May 26, 1958, and assigned to the assignee of the present invention.

Figure 2:
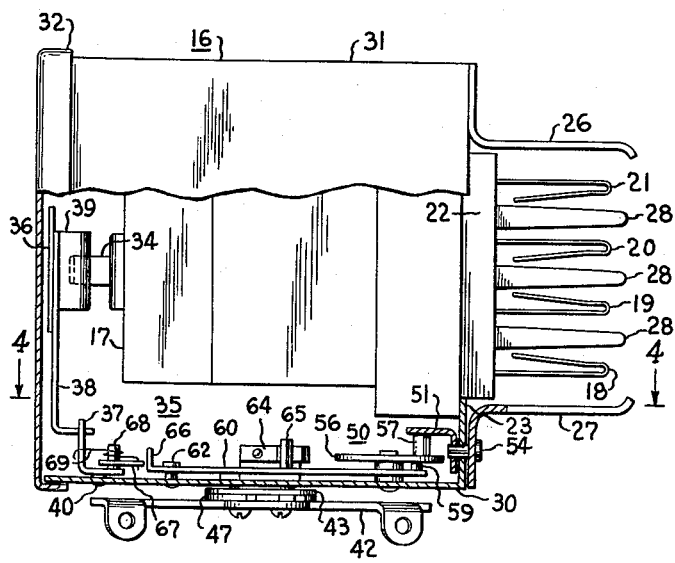
FIG. 2 is a sectional view taken along line 2—2 of FIG. 1 showing an interlocking mechanism constructed in accordance with one aspect of my invention.

In FIG. 1 a separate tap-off unit 16 is shown mounted on the busway 11. The unit 16 comprises a sheet metal box or enclosure inside which is housed an appropriate tap-off device 17, such as a safety switch or set of fuses, for controlling the supply of electric power to an individual utilization circuit, not shown. As is best seen in FIG. 2, the removable unit 16 in the illustrated embodiment of my invention includes four plug-in type disconnect contacts 18, 19, 20 and 21 projecting from a base member 22 mounted on the rearwall 23 of the unit, the contacts 18–21 being connected inside the unit to a 4-wire utilization circuit via the multipole tap-off device 17. The plug-in type disconnects 18–21 are adapted to enter the busway unit through aperture 15 to respectively effect engagement and disengagement with the slotted bus bars of the busway. While I have shown blade-like disconnects on the removable unit 16 for insertion into slots of the bus bars in busway 11, it will be understood that cooperating contacts of different form could be used to perform the disconnect function.

The removable unit 16 has mounted on its rearwall 23 a pair of hook-on type hangers 24 and a spacer bracket 25 (shown only in FIG. 1). The hangers 24 are adapted to hook over the rail 14 formed by the cooperating flanges of the cover plates 12 and 13 of the busway 11, and in this manner the removable unit is firmly secured in its mounted position on the busway unit over aperture 15, as can be seen in FIG. 1.

The unit 16 is guided during insertion and removal by a cantilever member 26 mounted on the rearwall 23 of the removable unit 16 in cooperation with the aperture 15 in the relatively stationary unit 11. The cantilever member 26 is adapted to be received in an enlarged end of the aperture 15, and the removable unit 16 can be mounted on busway 11 only if cantilever member 26 is in alignment with this cooperating opening in cover plate 12. The purpose of this arrangement is to ensure that as the removable unit 16 is mounted on the busway 11 the disconnect contacts 18–21 will be in line with the appropriate slots of the bus bars.

Cantilever member 26 is one of a plurality of barriers disposed adjacent the disconnect contacts 18–21 and projecting toward the busway generally parallel to the course of movement of the removable unit 16 for insertion through aperture 15. Member 26 comprises one of the end barriers as is shown in FIG. 2. Another cantilever member 27 comprises the other end barrier, and each of the intermediate barriers is identified by the reference number 28. These barriers are disposed to project through the aperture 15 into the busway 11 alongside of the bus bars, and the two end barriers 26 and 27 slidably engage the opposite sidewalls of the sheet metal enclosure of the busway. The end barriers also act as shields for the disconnect contacts 18–21 and protect them from damage during handling of the removable unit 16.

Figure 4:
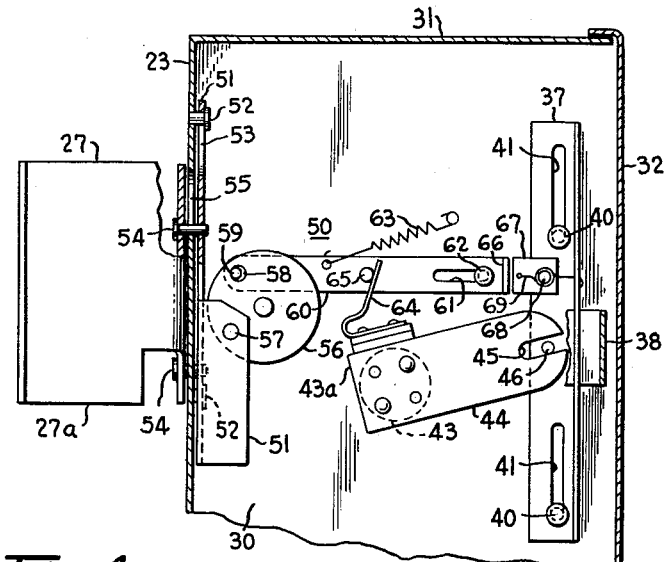
FIG. 4 is a sectional view taken along line 4—4 of FIG. 2 showing the interlocking mechanism of this aspect of my invention in its active position.

The above described structure of the removable unit 16 is in accordance with the disclosure of a copending patent application of Cecil B. Turton S.N. 759,353, filed September 5, 1958, and now Patent #2,984,769 assigned to the assignee of the present invention. As is described and claimed in the Turton application, the cantilever barrier 27 of the removable unit 16 is movably mounted on the unit and is provided with an enlarged free end or head 27a. The member 27 is disposed for rectilinear sliding movement in a plane generally perpendicular to the predetermined course of movement of the unit 16, and it can be moved in this plane between two different positions relative to unit 16. In FIGS. 1 and 4 member 27 is shown in a first one of its two positions, and in FIGS. 5 and 6 this member is shown in its other position. Movement of the member 27 is controlled by actuating means which will be described in detail hereinafter.

The cantilever member 27 projecting from the rear of the removable unit 16 comprises one interlock member of the plug-in type busway system. Another cooperating interlock member is provided in effect by the apertured cover plate 12 fixedly associated with the busway 11. The aperture 15 is appropriately configured and disposed with respect to barrier 27 for admitting the enlarged head 27a of the barrier during mounting and dismounting of the removable unit 16, and the entire head 27a is received by aperture 15 and contained within busway 11 with unit 16 mounted thereon. However, the head of barrier 27 registers with and passes through the aperture 15 as the unit 16 is moved along its predetermined course for mounting and dismounting only if the barrier 27 is in its second position shown in FIGS. 5 and 6. Upon movement of barrier 27 to its first position, the head 27a is out of register with the aperture 15 and is disposed in interfering relationship with the busway enclosure, whereby mounting or dismounting of the removable unit 16 is positively prevented. For example, as is clearly indicated in FIG. 1, the unit 16 cannot be appreciably moved along its predetermined course for the purpose of dismounting until barrier 27 has been moved to its second position wherein enlarged head 27a registers with aperture 15.

The above-described interlock member 27 in cooperation with the busway unit 11 is coordinated with the disconnect contacts 18–21 of unit 16 so that engagement and disengagement of the respective bus bars by the contacts 18–21 is effected while the enlarged head 27a is passing through the aperture 15. By suitably controlling the movement of member 27, this member can be positioned out of register with aperture 15 in response to the existence of a preselected condition, whereby mounting or removal of the unit 16 is prevented and neither engagement nor disengagement of the cooperating disconnect contacts can take place.

The removable unit 16 which encloses the circuit controlling tap-off device 17 comprises a pair of spaced-apart vertical sidewalls 30, a top plate 31, the rearwall 23, and an aperture at the front of the unit for providing access to its interior. The sidewalls, top plate and rearwall provide a frame for supporting the various parts disposed within the unit 16. An openable cover or door 32 is used to close the open front of the unit. In the illustrated embodiment of the invention, access cover 32 is hingedly attached to the unit and is releasably held by a suitable spring latch 33 (shown only in FIG. 6) in a closed position from which it is pivotally movable to an open position with respect to the unit.

Any suitable electric circuit controlling tap-off device may be mounted within the removable unit 16. For example, the device can comprise a molded-case circuit breaker 17 which has been shown in block form in FIGS. 1 and 2. The circuit breaker 17 has projecting from its front a manually operable switch member 34 for actuating suitable contacts (not shown) which make and break the electric circuit in which the breaker is connected. The breaker 17 is provided with suitable terminals (not shown) by means of which it is connected between the disconnects 18–21 and the utilization circuit being controlled.

In circuit breaker 17, which has been illustrated for the sake of example, the switch member 34 is pivotally movable in a vertical plane between an "on" or closed-circuit position in which the breaker contacts are closed and an "off" or open-circuit position (34' in FIG. 1) to which the switch member is turned in order to open the switch contacts. The circuit controlling device 17 is operated by manual movement of its switch member 34, and in the FIGS. 1–5 embodiment of my invention this operation is accomplished by an externally controlled operating mechanism 35 movably supported within the unit 16 in cooperation with the switch member 34.

The operating mechanism 35 for the tap-off device 17 enclosed in unit 16 preferably comprises the improved construction and arrangement fully described and claimed in a copending patent application of Myron A. Cutler and Cecil B. Turton S.N. 776,542, filed November 26, 1958, and now Patent No. 2,938,096, assigned to the assignee of the present invention. This mechanism includes a plate member 36 slidably supported on the inside of the unit cover 32 by suitable brackets (not shown) for rectilinear movement in a vertical plane parallel to the cover, a vertically oriented oblong member 37 which is carried by the sidewall 30 of the unit for rectilinear movement in a direction parallel to the direction of movement of the plate member 36 when the cover is closed, and a transversely extending interconnecting link 38 affixed to the plate member 36 and disposed in operative engagement with the oblong member 37 whenever the cover 32 is closed to provide for joint rectilinear movement of the members 36 and 37.

The plate member 36 of the operating mechanism 35 is arranged to be operatively coupled to the switch member 34 for operating the device 17 whenever the cover 32 is closed. This is accomplished by a pair of spaced-apart projections 39 secured to plate 36 and projecting rearwardly therefrom, the space between the projections 39 forming a horizontal trough of suitable width to receive the switch member 34 of device 17. See FIG. 1. Vertical movement of the plate member 36 with the cover 32 closed and switch member 34 disposed between elements 39 causes pivotal movement of the member 34, thereby effecting operation of the device 17.

Figure 5:
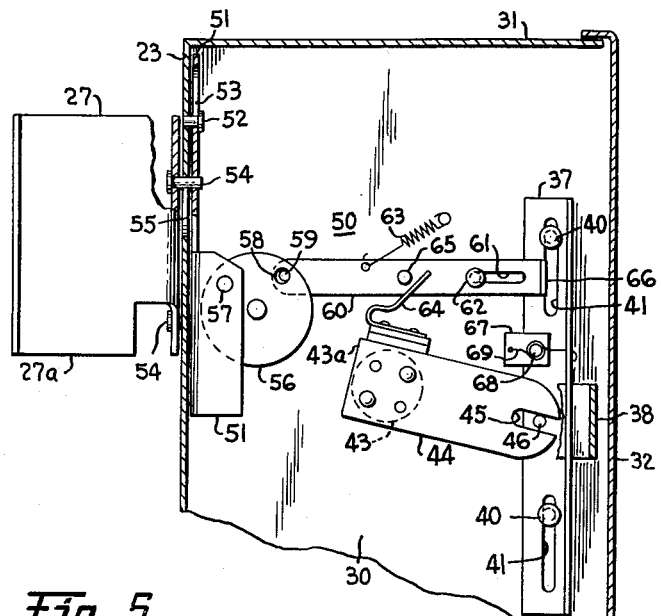
FIG. 5 is a sectional view similar to FIG. 4 with the interlocking mechanism shown in its inactive position.

As best seen in FIGS. 4 and 5 an oblong operating mechanism member 37 is slidably supported inside unit 16 by means of a pair of vertically aligned guide pins 40 extending inwardly from the sidewall 30 in cooperation with vertical slots 41 in the oblong member 37. The operating mechanism 35 is constructed that interconnecting link 38 operatively engages the oblong member 37 during movement of the cover 32 to its closed position before the plate member 36 becomes operatively coupled to the switch member 34 of the tap-off device 17. This cooperation between the respective parts of the operating mechanism ensures that all parts of the mechanism are positively coupled together for joint movement before the mechanism is in position to operate the device 17.

The operating mechanism 35 includes means for actuating the members 36—38 from the exterior of the unit 16. This means is shown as comprising an external operating handle 42 which, as can be seen in FIGS. 1 and 2, is removably mounted on a rotatable member 43 supported by sidewall 30 for rotation about an axis. Inside the enclosure the rotatable member 43 has an arm 44 attached thereto having an open-end slot 45 which receives a cooperating pin 46 of the slidably supported oblong member 37. See FIGS. 4 and 5. Thus, pivotal movement of the operating handle 42 and the member 43 about the axis of rotation causes rectilinear movement of the oblong member 37. The member 43 is coupled by the associated members 36–38 of the operating mechanism to the switch member 34, and consequently pivotal movement of 43 between first and second angular positions operates the tap-off device 17.

The member 43 also includes a position indicating pointer 47 which points to the legends "on" and "off" lettered at appropriate locations on the outside of sidewall 30 of the removable unit 16. See FIG. 1. These legends, of course, refer to the positions of the switch member 34 of the enclosed circuit breaker 17 corresponding to the particular angular position of the rotatable cam member as identified by the pointer. Manual movement of the operating handle 42 rotates the member 43 to which it is connected from the "on" position shown in FIG. 1 to the "off" position, thereby actuating the operating mechanism 35 disposed within the power tap-off unit 16 and effecting operation of the enclosed tap-off device to an open-circuit condition.

In accordance with the disclosure of the aforementioned copending application of Cutler and Turton S.N. 776,542, the external operating handle 42 for actuating the operating mechanism 35 may also be mounted on the access cover 32 for operating the enclosed device 17 from the front of unit 16. However, since the details of the operating mechanism per se are not material to the present invention, I have chosen for the sake of drawing simplicity to omit this alternative arrangement from the drawings. It will be understood, of course, that in the event the operating handle 42 is located on the unit cover 32, the member 43 supported by side-wall 30 will be rotatably driven or actuated by the oblong member 37 of the operating mechanism 35 to which it is positively coupled.

In accordance with my invention, the rotatable member 43 of the operating mechanism is used to impart motion to an interlocking mechanism 50 which is used to control the movement of cantilever member 27 in FIGS. 1–5 embodiment of the invention. The interlocking mechanism 50 includes a vertically oriented elongated bar 51 of generally L-shaped horizontal cross-section which is slidably supported inside the removable unit 16 adjacent rearwall 23 by means of a pair of pins 52 projecting from the rearwall and received in cooperating slots 53 of bar 51. See FIGS. 2, 4 and 5. The cantilever member 27 is rigidly connected to bar 51 for joint movement therewith by means of a pair of pins 54 extending into the unit 16 and confined in a pair of colinear elongated slots 55 located in the rearwall 23. In this manner, the cantilever member 27 is supported by unit 16 for rectilinear sliding movement between its two different positions. If desired, the cantilever member 27 could be mounted on the base member 22 in which case the connection to the interlocking mechanism 50 would be the same as that just described.

The interlocking mechanism 50 includes a bell crank 56 pivotally mounted on the sidewall 30 near the rear of the removable unit 16 and connected to the cantilever member 27 for controlling its movement. The bell crank 56 is preferably disk-shaped, and the connection between the bell crank and the cantilever member 27 is accomplished by a pin 57 affixed to the bar 51 and loosely disposed in a cooperating hole in 56. Thus rotary movement of bell crank 56 produces rectilinear movement of the cantilever member 27. The bell crank 56 is provided with a hole 58 disposed at approximately 90 degrees from the pin 57 for loosely receiving a pin 59 affixed to one end of an elongated lever or actuating arm 60. As is clearly seen in FIGS. 4 and 5, the lever 60 extends from bell crank 56 at the rear of unit 16 to the front of the unit and is disposed for longitudinal movement in a horizontal direction. An elongated slot 61 in lever 60 rides on a pin 62 projecting inwardly from the sidewall 30, and suitable spring means, such as the illustrated tension spring 63, is connected to the lever 60 in order to bias the lever toward the front of the unit 16. The bell crank 56, which interconnects lever 60 and cantilever member 27, translates the longitudinal movement of lever 60 into rectilinear movement of member 27.

The interconnected combination of lever 60, bell crank 56, bar 51 and cantilever member 27 in effect comprise a relatively movable interlock element which is spring biased to a normally "inactive" position shown in FIG. 5. In this inactive position of the interlock element, cantilever member 27 is in its first position wherein it registers with aperture 15 of the busway unit 11 and thereby permits mounting and dismounting of the removable unit 16, as has been explained hereinbefore. The interlock element is movable against its bias provided by spring 63 to an "active" position shown in FIGS. 2 and 4 in which the member 27 has been moved to a position wherein mounting and dismounting of the removable units 16 is positively prevented. By suitably controlling this movement of the interlock element, the desired interlocking function can be obtained.

In the embodiment of my invention illustrated in FIGS. 1–5, movement of the interlock element is controlled by the rotatable member 43 of the operating mechanism 35. The member 43 is provided with a relatively resilient arm 64 disposed to engage a pin 65 projecting inwardly from lever 60 intermediate its ends. Pivotal movement of member 43 in a counterclockwise direction from the angular position shown in FIG. 5 to the angular position shown in FIG. 4 will impart rearward longitudinal motion to lever 60 in opposition to the bias provided by spring 63, whereby bell crank 56 is rotated counterclockwise to drive bar 51 and cantilever member 27 to its first or active position. Thus member 27 is actuated in accordance with the operation of the operating mechanism 35. The interlock element will be returned to its inactive position by the action of spring 63 upon clockwise movement of member 43 from the angular position shown in FIG. 4. Since, as can be clearly seen in FIGS. 4 and 5, the member 43 has two arms 44 and 64 attached thereto disposed at substantially 90 degrees with respect to each other, this assembly of parts may be thought of and will be referred to hereinafter as a bell crank 43a. The elongated lever or actuating arm 60 serves to interconnect the two bell cranks 56 and 43a respectively disposed at the rear sidewall 30 and relatively near the front of the removable unit 16.

The bell crank 43a is coupled to lever 60 of the interlock element by the arm 64 which is made relatively resilient to provide for a slight amount of overtravel of the bell crank 43a with respect to the interlock element. This is desirable in that it eliminates the need for precise coordination between the limiting angular positions of bell crank 43a and the active and inactive positions of the interlock element. However, it is possible that the function of the interlocking mechanism could be circumvented by forcibly moving the cantilever member 27 to its inactive position without moving the bell crank 43 from the angular position shown in FIG. 4. To eliminate this contingency and to prevent improper operation of the interlocking mechanism, I have provided special locking means which will now be described in detail.

As can be seen in FIGS. 2, 4 and 5, the elongated lever 60 of the interlock element is provided at its forward end with an inwardly turned stop portion 66 which is disposed for reciprocal movement in a linear, front-to-rear path between first and second predetermined positions. In FIGS. 2 and 4 the rigid stop portion 66 is shown in its first predetermined position, corresponding to the active position of the interlock element, while portion 66 is shown in its second predetermined position, corresponding to the inactive position of the interlock element, in FIG. 5. In cooperation with the stop portion 66, a blocking member 67 is mounted for relative movement on the slidably supported oblong member 37. The blocking member 67 preferably comprises a rectangular piece pinned to member 37 at 68, and a suitable centering spring 69 is provided yieldably maintaining the blocking member in the position shown in FIGS. 2, 4 and 5. In this position the blocking member 67 projects behind the oblong member 37 in a generally horizontal direction.

Rectilinear sliding movement of the oblong member 37, which movement is in a direction substantially perpendicular to the direction of lengthwise movement of the elongated lever 60, carries blocking member 67 along a predetermined path substantially perpendicular to the linear path of movement of the stop portion 66 of the interlock element. Since the oblong member 37 is coupled to arm 44 of the bell crank 43a, the limiting angular positions of bell crank 43 determine the opposite ends of the predetermined path of movement of the blocking member 67. As the bell crank 43a moves into its angular position shown in FIG. 4, consequently moving the interlock element to its active position and the stop portion 66 to its first position, the blocking member 67 is moved into a position of interference with stop portion 66, shown in FIGS. 2 and 4.

While moving into this position of interference, the top of the blocking member 67 encounters the bottom of stop portion 66 which is moving in a rearward direction from its second position to its first position. The blocking member 67 is deflected or yields as a result of this encounter until the stop portion 66 passes beyond it, at which point the centering spring 69 will impel the blocking member to its normal position with respect to the oblong member 37 as is shown in FIG. 4. Now the interlock element is positively blocked in its active position, and should force be improperly applied to the cantilever member 27 in an attempt to defeat the interlocking function, the interlock element will be enable to move out of its active position. Upon attempting such improper operation, stop portion 66 will abut the rearward face of blocking member 67 which provides a direct mechanical stop for lever 60. The blocking member 67 can be moved out of its interfering position only in response to rotation of the bell crank 43 toward its angular position shown in FIG. 5 by the actuating means, e.g., operating handle 42.

From the foregoing detailed descripton of the structure of my invention as embodied in FIGS. 1–5, its mode of operation may now be readily followed. The object to be accomplished is to prevent mounting or dismounting of the removable tap-off unit 16 with the respect to the relatively stationary busway unit 11 whenever the tap-off device housed in unit 16 is in a closed-circuit or on condition. Whenever the switch member 34 of the tap-off device 17 is operated to its on position by the operating handle 42 mounted on the side or the front of the unit 16, bell crank is actuated to the particular angular position in which it is shown in FIG. 4. In reaching this position, arm 64 of the bell crank 43a has moved lever 60 of the interlocking mechanism 50 against its bias in a rearward direction, whereby bell crank 56 has been rotated and bar 51 together with interlock member 27 have been moved rectilinearly in a downward direction. Thus the interlock element (mechanism 50 and member 27) is in its active position in which, as is indicated in FIG. 1, dismounting or mounting of the removable unit 16 is positively prevented. The removable element cannot be forced to its inactive position due to the blocking member 67 which is also coupled to the bell crank 43 and has been moved thereby into an interfering position with the stop portion 66 of the interlock element. During operation of the mechanism 35 to turn the tap-off device 17 "off," the bell crank 43a is pivoted to its position shown in FIG. 5, the blocking member 67 is moved downwardly along its rectilinear path to a non-interfering position, and the stop portion 66 of the interlock element is released for forward movement to its second position. Spring 63 will now move the elongated lever 60 forward, along its linear path whereby bell crank 56 is rotated and the bar 51 and member 27 are slidably moved upwardly. In this manner the interlock element is moved to its inactive position shown in FIG. 5, and consequently the removable unit 16 can be dismounted or mounted at will.

Figure 6:
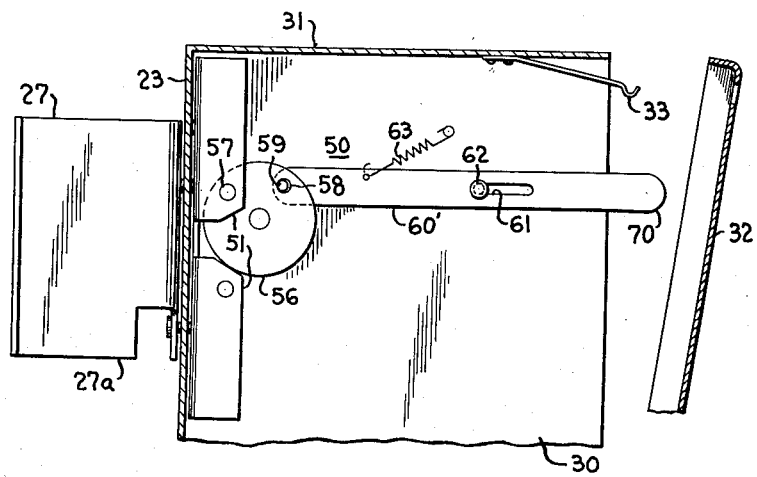
FIG. 6 is a sectional view of removable tap-off unit similar to FIG. 5 but showing an interlocking mechanism constructed in accordance with another embodiment of my invention.

The embodiment of my invention illustrated in FIG. 6 is different from that described above in that the operating mechanism 35 is absent. Instead of controlling the operation of the tap-off device 17 housed in removable unit 16 by means of the external operating handle 42 and other related parts of the operating mechanism 35, the enclosed device is arranged to be operated by movement of the openable cover 32 of the unit. This is known as a cover-operated switch, and since the details of the mechanism interconnecting the cover and the switch member of the tap-off device are not material to the present invention, such details have not been included in FIG. 6. It will be understood that the tap-off device is in a closed-circuit condition when the openable cover 32 is closed, and the device is operated to an open-circuit condition by the act of opening the cover 32.

The interlocking mechanism 50 of the FIG. 6 embodiment of my invention is essentially the same as the interlocking mechanism described above in connection with FIGS. 1–5. The sliding cantilever member 27 is rigidly fastened to bar 51 which in turn is connected by a pin 57 to the bell crank 56 of the interlocking mechanism. The bell crank 56, which is pivotally supported by sidewall 30 of the removable unit 16, is connected by means of pin 59 to the rearward end of the elongated actuating member or lever 60' which differs from the lever 60 of FIGS. 2, 4 and 5 in that its forward end is extended at 70 for abutting engagement by the openable cover 32. The lever 60' is biased by spring 63 to the position shown in FIG. 6, and this position is determined by an elongated slot 61 in the lever which rides on a guide pin 62 projecting inwardly from the sidewall 30. Thus the interlocking mechanism 50 of FIG. 6 interconnects cantilever member 27 and the openable cover 32 for actuating the member 27 in accordance with the opening and closing of the cover.

The operation of the FIG. 6 embodiment of my invention may now be readily followed. The lever 60' of the interlocking mechanism is moved longitudinally in a rearward direction from the position shown in FIG. 6 upon closing the cover 32 which pushes against the forward end 70 of the lever. This longitudinal movement of the lever 60' is translated by bell crank 56 into rectilinear movement of the cantilever member 27 which is consequently moved from the inactive position indicated in FIG. 6 to an active position wherein it is capable of preventing mounting or dismounting of the removable unit 16 with respect to the busway unit 11. The interlock element is held in this active position by cover 32 as long as the cover is closed. Upon subsequently opening the cover 32, the interlock element is returned to its inactive position by action of the spring bias 63, and now the movable unit 60 may be freely mounted or dismounted with respect to the busway.

Sometimes it is desirable to prevent opening the access cover 32 of the removable unit 16 as long as the unit is mounted on the busway 11. For example, where the tap-off device comprises a fused safety switch, safe operating procedure may call for the removal of the unit 16 from the busway 11 before opening the cover 32, whereby access to "live" or energized fuses is avoided. Toward this end, the interlocking mechanism best illustrated in FIG. 3 has been provided.

Figure 3:
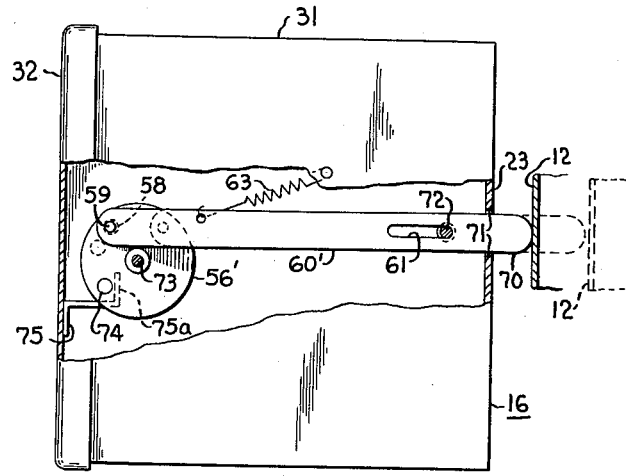
FIG. 3 is a partial sectional view taken along line 3—3 of FIG. 1 showing an interlocking mechanism constructed in accordance with another aspect of my invention.

The various parts of the interlocking mechanism of FIG. 3 are essentially interchangeable with the corresponding parts of the interlocking mechanism of FIG. 6. In FIG. 3 the spring biased, elongated actuating arm or 'ever 60' is disposed so that its extended end 70 projects rearwardly through a cooperating aperture 71 in the rearwall 23 of the removable unit 16 for abutting engagement with the busway enclosure 12. The lever 60' is provided at its other end with pin 59, and it is slidably supported for longitudinal movement by means of the slot 61 which rides on a guide pin 72 affixed to a wall of the unit 16. Pin 59 is loosely disposed in a hole 58 in the bell crank 56' which is pivotally mounted at 73 on a wall of the housing 16 adjacent the openable access cover 32. Although the lever 60' and the bell crank 56' may be supported on any wall of the unit 16, for the purpose of illustration I have shown them in FIG. 3 supported by the top plate 31. The bell crank 56' is provided with an interlock pin 74 disposed at approximately 90 degrees from the hole 58 with respect to the pivotal axis of the bell crank. Rotary movement of bell crank 56' produced by longtiudinal movement of the elongated lever 60' causes pin 74 to move in a direction generally parallel to the front of the removable unit 16 and consequently parallel to the openable cover 32.

A cooperating interlock member or bracket 75 of generally Z-shaped configuration is secured to the inner surface of the openable cover 32. As is clearly seen in FIG. 3, member 75 has an upstanding portion projecting rearwardly from cover 32 and terminating with a flanged portion 75a which extends generally parallel to the cover. The respective parts of the interlocking mechanism are arranged so that pin 74 of bell crank 56', referred to hereinafter as the locking member, is disposed in engaging relationship with the interlock member 75 and consequently with the access cover 32 with which the interlock member 75 is integrally associated. With the removable unit 16 mounted on the busway 11 as shown in FIGS. 1 and 3, the locking member 74, 56' is in releasably holding relationship with access cover 32. That is, the locking member is in a position wherein interlock pin 74 is disposed between the flange 75a of interlock member 75 and cover 32 thereby obstructing the path which flange 75a must follow when opening cover 32. The cover 32 is therefore held in its closed position until the removable unit 16 is dismounted.

Upon dismounting the unit 16, the rearwardly projecting end 70 of the elongated lever 60' no longer engages the enclosure 12 of the busway 11, and the interlocking mechanism is now free to move under the influence of its bias 63 to the position indicated by dotted lines in FIG. 3. In this cover-releasing position, the bell crank 56 has been pivoted clockwise, as viewed in FIG. 3, so that interlock pin 74 is no longer in front of flange 75a of the interlock member 75 and the access cover 32 is now released for opening movement at will. Thus the access cover 32 is held closed and released in response to mounting and removal, respectively, of unit 16 with respect to the busway 11, and the desired interlocking function is accomplished.

While I have shown and described certain preferred embodiments of my invention by way of illustration, many modifications will occur to those skilled in the art. Therefore, I contemplate by the concluding claims to cover all such modifications as fall within the true spirit and scope of my invention.

What I claim as new and desire to secure by Letters Patent of the United States is:

1. In an electric power distribution system; a relatively stationary unit housing a source of electric power; a removable unit housing a power tap-off device disposed for mounting and dismounting with respect to the relatively stationary unit; a pair of cooperating disconnect contacts associated with the stationary and removable units, respectively, for establishing electrical connection between the tap-off device and the source of power when the removable unit is mounted on the stationary unit; a relatively movable interlock element supported by the removable unit for movement between an active position and an inactive position, a rigid stop portion of the interlock element reciprocally movable along a linear path between first and second predetermined positions corresponding respectively to said inactive and active positions, said interlock element including means disposed in cooperation with the stationary unit to prevent mounting or dismounting of the removable unit when in said active position and to permit mounting and dismounting of the removable unit when in said inactive position; a bell crank having two arms pivotally supported by the removable unit for movement between first and second angular positions, one arm of the bell crank being coupled to the interlock element for moving the interlock element from its inactive to its active position in response to movement of the bell crank from its first to its second angular position; actuating means for moving the bell crank; and a cooperating element movably supported by the removable unit and coupled to the other arm of the bell crank, said cooperating element having a blocking portion responsive to movement of the bell crank from its first to its second angular position for rectilinear movement along a predetermined path, oriented generally perpendicular to the linear path of said portion, into interfering relationship with said stop portion to prevent movement of said stop portion toward its first position thereby positively blocking the interlock element in its active position until the blocking portion is moved to a non-interfering position by operation of the actuating means.

2. In an electric power distribution system: a relatively stationary unit housing a source of electric power; a removable unit housing a tap-off device adapted to be mounted and dismounted with respect to the relatively stationary unit; a pair of cooperating disconnect contacts associated with the stationary and removable units, respectively, for establishing electrical connection between the tap-off device and the source of power when the removable unit is mounted on the stationary unit; a spring biased interlock element mounted on the unit for movement between a normally inactive position and an active position relative to the removable unit and disposed in cooperation with the stationary unit to prevent and permit mounting or dismounting of the removable unit when in its active and inactive positions, respectively, said interlock element having a rigid stop portion disposed for movement in a linear path between first and second predetermined positions corresponding respectively to said inactive and active positions of the interlock element; a bell crank having two arms rotatably mounted on the removable unit, one of said arms being coupled to the interlock element; actuating means for rotating the bell crank between first and second angular positions thereby to move the interlock element between said inactive and active positions, respectively; and a blocking member coupled to the other arm of the bell crank for rectilinear movement along a predetermined path substantially perpendicular to the linear path of movement of said stop portion in response to rotation of the bell crank between its first and second positions, said blocking member being disposed for yieldable movement into a position of interference with said stop portion upon rotation of the bell crank to its second positions for positively blocking the interlock element in its active position until the blocking member is moved out of said position of interference in response to rotation of the bell crank toward its first angular position by the actuating means.

3. In combination: a supporting frame; an interlock member supported by the frame for rectilinear movement between predetermined first and second positions; a first bell crank pivotally mounted on the frame and having a pair of arms, one of the arms being connected to the interlock member; and elongated lever disposed for lengthwise movement and connected at one end to the other arm of said first bell crank; a second bell crank pivotally mounted on the frame and having two arms, one arm of said second bell crank being connected to the elongated lever intermediate its ends; actuating means for pivotally moving the second bell crank thereby to move the interlock member from its first to its second position; spring means disposed to return the interlock member to its first position; and a blocking member connected to the other arm of the second bell crank for rectilinear movement, in a direction substantially perpendicular to the direction of lengthwise movement of the elongated lever, into a position of interference with the other end of said lever as the second bell crank moves the interlock member into its second position thereby blocking the interlock member in its second position until the blocking member is moved to a non-interfering position by operation of the actuating means.

4. In an electric power distribution system; a busway comprising a plurality of bus bars in a sheet metal enclosure having an aperture for a limited access to the bus bars; a removable sheet metal unit enclosing a multipole tap-off device adapted to be mounted and dismounted with respect to the busway, said removable unit having projecting from one side thereof a plurality of plug-in type disconnect contacts disposed to enter the busway enclosure through said aperture for respectively engaging the bus bars; an interlock element movably mounted on the removable unit comprising, a cantilever member projecting from said one side and disposed for rectilinear movement between first and second positions, said cantilever member having an enlarged free end which registers with the aperture in the busway enclosure only when said member is in its first position thereby to permit mounting and dismounting of the removable unit and which is moved out of register with said aperture to prevent mounting or dismounting of the removable unit whenever said member is moved to its second position, a first bell crank having a pair of arms one of which is connected to the cantilver member, an elongated lever disposed for lengthwise movement and connected at one end to the other arm of said first bell crank, and spring means connected to the lever in order to bias the cantiliver member to its first position; a second bell crank pivotally mounted on the removable unit and having two arms, one arm of said second bell crank being connected to the elongated lever intermediate its ends; actuating means for pivotally moving the second bell crank thereby moving the cantilever member from its first to its second position; and a blocking member connected to the other arm of the second bell crank for rectilinear movement, in a direction substantially perpendicular to the direction of lengthwise movement of the elongated lever, into a position of interference with the other end of said lever as the second bell crank moves the cantilever member into its second position thereby blocking the cantilever member in its second position until the blocking member is moved to a non-interfering position by operation of the actuating means.

5. In an electric power distribution system: a relatively stationary unit housing a source of electric power; a removable unit adapted to house a power tap-off device and having an openable access cover disposed in a closed position, said removable unit being adapted for mounting and dismounting with respect to the relatively stationary unit; a pair of cooperating disconnect contacts associated with the removable and stationary units, respectively, for establishing electrical connection between the tap-off device and the source of power with the removable unit mounted on the stationary unit; and locking means mounted in the removable unit in releasably holding relationship to the access cover, said locking means being disposed for actuation in response to the mounting of the removable unit on the stationary unit to hold said cover in its closed position until the removable unit is dismounted.

6. In combination: a relatively stationary unit housing a source of electric power; a separate sheet metal unit housing a tap-off device removably mounted on the relatively stationary unit, said tap-off unit having an aperture for access to the tap-off device and an openable cover disposed in a closed position for covering said aperture; two pair of cooperating disconnect contacts associated with the tap-off and the source units respectively for establishing electrical connection between the tap-off device and the source of power; a movable locking member mounted in the tap-off unit and disposed in engageable relationship with said cover for releasably holding said cover in its closed position; and actuating means responsive to removal of the tap-off unit from the source unit for controlling the movement of said locking member to move said locking member to a cover-releasing position only in response to removal of the tap-off unit from the source unit.

7. In combination: an electrical power busway comprising a plurality of bus bars in a sheet metal enclosure; a removable sheet metal unit enclosing a multipole tap-off device disposed for mounting and dismounting with respect to the busway, said removable unit having an aperture for access to the tap-off device and an openable cover disposed in a closed position for covering said aperture, said cover having a first interlock member integrally associated therewith; at least two pairs of cooperating disconnect contacts, the contacts of each pair being associated with the bus bars of the busway and the tap-off device of the removable unit respectively for engagement and disengagement upon mounting and dismounting respectively of the removable unit; locking means comprising a bell crank pivotally mounted in the removable unit adjacent said cover, said bell crank having a second interlock member movable to a position in cooperation with the first interlock member for holding the cover closed; and a spring biased elongated actuating arm coupled at one end to the bell crank and having its other end disposed for abutting engagement with the busway enclosure upon mounting of the removable unit, said actuating arm being longitudinally moved in opposition to its bias in response to the mounting of said unit for moving the second interlock member to its cover holding position.

8. In an electric power distribution system; a relatively stationary unit housing a source of electrical power; a removable unit for housing a power-tap-off device and having an access cover movable to closed and open positions, said removable unit being adapted for mounting and dismounting with respect to the relatively stationary unit; a pair of cooperating disconnect contacts associated with the stationary and removable units, respectively, for establishing electrical connection between the tap-off device and the source of power with the removable unit mounted on the stationary unit; an interlock member movably mounted on the removable unit for movement between two spaced-apart positions, said member being disposed in one said position to engage said stationary unit in either mounting or dismounting movement of the removable unit and in the other said position to be in non-interfering relation with said stationary unit; and means interconnecting the interlock member and the cover of the removable unit for actuating said member in accordance with the opening and closing of said cover to move said member to its predetermined one position in response to closure of said cover whereby said removable unit can be neither mounted nor dismounted whenever said cover is closed.

9. In an electric power distribution system: a busway comprising a plurality of bus bars in a sheet metal enclosure having an aperture for limited access to the bus bars; a removable sheet metal unit enclosing a multipole tap-off device reciprocally movable along a predetermined course for mounting and dismounting with respect to the busway, said removable unit having at its front an access cover movable to closed and open positions and having projecting from the rear thereof a plurality of plug-in type disconnect contacts disposed to enter the busway enclosure through said aperture for respectively engaging the bus bars; an interlock movably mounted on the removable unit comprising a cantilever member projecting from the rear of the removable unit and disposed for movement in a plane generally perpendicular to said predetermined course between two different positions relative to the removable unit, said cantilever member having an enlarged free end which registers with the aperture in the busway enclosure only when said member is in predetermined one of its two positions and which is moved out of register with said aperture whenever said member is moved to its other position; and means interconnecting the cantilever member and the cover of the removable unit for actuating said member in accordance with the opening and closing of said cover to move said member to its other position thereby to prevent mounting or dismounting of the removable unit whenever said cover is closed.

10. In combination: a relatively stationary unit housing a source of electric power: a removable sheet metal unit housing a tap-off device adapted to be mounted and dismounted with respect to the relatively stationary unit, said removable unit having an aperture for access to the tap-off device and an openable cover movable to a closed position covering said aperture; a pair of cooperating disconnects associated with the removable and stationary units, respectively, for establishing electrical connection between the tap-off device and the source of power when the removable unit is mounted on the stationary unit; and an interlock element comprising two interconnected members mounted on the removable unit for movement between active and inactive positions relative to the removable unit, one of said members in the active position of the element being disposed in interfering relationship with the statonary unit and in the inactive position of the element beng disposed in a non-interfering relationship with the stationary unit, the other member of said interlock element being connected to actuate said one member between said positions in response to movement of said cover, said element being spring biased to its inactive position and being held in its active position by the cover when closed, whereby the removable unit cannot be mounted or dismounted whenever said cover is closed.

11. In combination: a relatively stationary sheet metal unit enclosing a source of electric power; a removable sheet metal unit enclosing a tap-off device disposed for mounting and dismounting with respect to the relatively stationary unit, the removable unit having an opening for access to the tap-off device and an openable cover movable to a closed position covering said opening; a pair of cooperating disconnects associated with the removable and stationary units respectively for establishing electrical connection between the tap-off device or the source of power; and interlock member mounted on the removable unit for movement between first and second positions relative to the removable unit and disposed in cooperation with the stationary unit to prevent mounting or dismounting of the removable unit when in said first position and to permit mounting and dismounting of the removable unit when in said second position; a spring biased, elongated actuating arm movably mounted in the removable unit and having one end disposed for abutting engagement by the openable cover upon movement of the cover to its closed position, said actuating arm being longitudinally moved in opposition to its bias in response to the closing of the cover; and means including a bell crank coupled to the interlock member and to the other end of said actuating arm for moving said member to its first position in response to said longitudinal movement of the arm.

12. In an electric power distribution system: a relatively stationary unit housing a source of electric power; a removable unit housing a power tap-off device having a movable switch member, said removable unit being adapted for mounting and dismounting with respect to the relatively stationary unit; a pair of cooperating disconnect contacts associated with the stationary and removable units respectively for establishing electrical connection between the tap-off device and the source of power with removable unit mounted on the stationary unit; an operating mechanism for the tap-off device supported by the removable unit and including a movable operating member adapted to be coupled to said switch member; an interlock member mounted on the removable unit for rectilinear movement between two different positions relative to the removable unit, said interlock member being disposed in cooperating relationship with the stationary unit to prevent mounting or dismounting of the removable unit when in a predetermined one of its two positions and to permit mounting and dismounting of the removable unit when in its other position; and means interconnecting the interlock member and the operating member for actuating the interlock member in accordance with operating of the operating mechanism comprising an elongated actuating arm and a bell crank, said actuating arm being connected to the operating member for longitudinal movement in response to operation of the operating mechanism and said bell crank being coupled to the actuating arm and to the interlock member for translating the longitudinal movement of the actuating arm into rectilinear movement of the interlock member.

13. In an electric power distribution system: a relatively stationary unit housing a source of electric power; a removable unit housing a circuit controlling device having a switch member movable between open and closed circuit positions, said removable unit being adapted for mounting and dismounting with respect to the relatively stationary unit; a pair of cooperating disconnect contacts associated with the stationary and removable units respectively for establishing electrical connections between the circuit controlling device and the source of power with the removable unit mounted on the stationary unit; an operating mechanism including a first bell crank pivotally mounted on the removable unit and disposed for moving the switch member of said circuit controlling device between said open and closed circuit positions; an interlock member movable between two different positions relative to the removable unit and disposed in cooperating relationship with the stationary unit to prevent mounting or dismounting of the removable unit only when in predetermined one of said two positions; a second bell crank pivotally mounted on the removable unit and connected to the interlock member for controlling its movement; and a movable actuating member interconnecting both of the bell cranks thereby to move the interlock member in response to operation of said operating mechanism.

14. In an electric power distribution system: a relatively stationary unit housing a source of electric power; a removable unit housing a circuit controlling device having a switch member movable between open and closed circuit positions, said movable unit being adapted for mounting and dismounting with respect to the relatively stationary unit and having projecting from its rear a plurality of plug-in type disconnect contacts disposed to enter into the relatively stationary unit for establishing electrical connections between the source of power and the circuit controlling device when the removable unit is mounted on the stationary unit; and operating mechanism, including a first bell crank pivotally mounted adjacent the front of the removable unit, disposed within the removable unit for moving the switch member of said circuit controlling device between said open and closed circuit positions; an interlock comprising a cantilever member projecting from the rear of the removable unit and disposed for movement between two different positions relative to the removable unit, said cantilever member being disposed in cooperation with the stationary unit to prevent mounting or dismounting of the removable unit only when in a predetermined one of said two positions; a second bell crank pivotally mounted adjacent the rear of the removable unit and connected to the cantilever member for controlling its movement; and a spring biased elongated actuating member interconnecting both of the bell cranks thereby to move the cantilever member in response to operation of said operating mechanism.

References Cited in the file of this patent

UNITED STATES PATENTS

| | | |
|---|---|---|
| 1,821,224 | Lewis | Sept. 1, 1931 |
| 2,256,910 | Rowe | Sept. 23, 1941 |
| 2,550,125 | Schueler et al. | Apr. 24, 1951 |
| 2,888,529 | Platz | May 26, 1959 |
| 2,938,096 | Cutler | May 24, 1960 |
| 2,984,769 | Turton | May 16, 1961 |